April 29, 1924.
S. K. NIEMI
1,492,308
LUBRICATING ARRANGEMENT FOR ENGINE PISTONS
Filed July 5, 1923
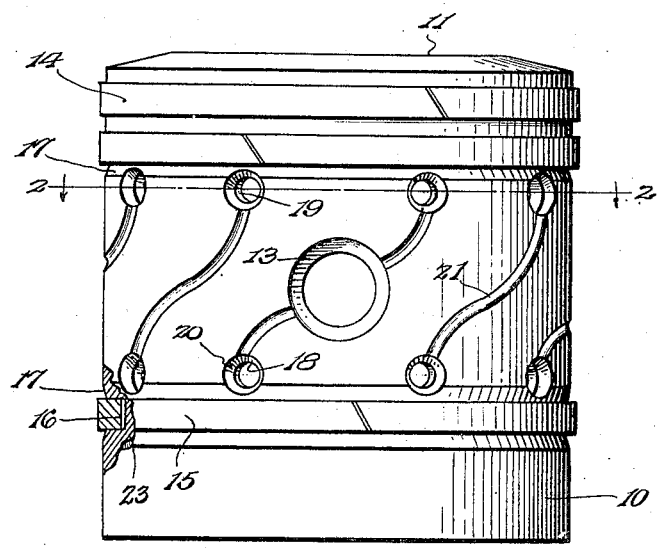
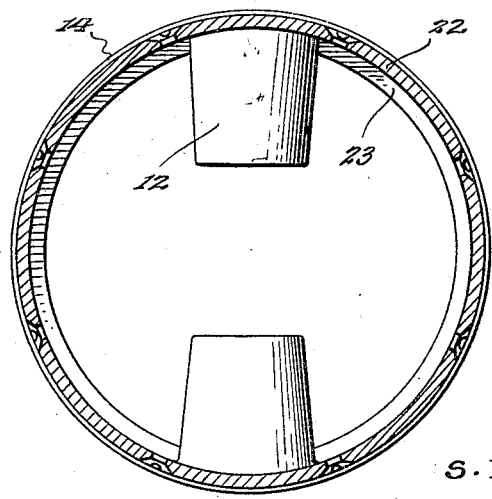
Inventor
S. K. Niemi.
By Lacey & Lacey, Attorneys Patented Apr. 29, 1924.

1,492,308

UNITED STATES PATENT OFFICE.

SAKARIAS K. NIEMI, OF HOPPER, MINNESOTA.

LUBRICATING ARRANGEMENT FOR ENGINE PISTONS.

Application filed July 5, 1923. Serial No. 649,547.

*To all whom it may concern:*

Be it known that I, SAKARIAS K. NIEMI, a citizen of the United States, residing at Hopper, in the county of St. Louis and State of Minnesota, have invented certain new and useful Improvements in Lubricating Arrangements for Engine Pistons, of which the following is a specification.

The present invention relates to pistons for engines or pumps and more particularly to pistons for internal combustion engines, and the main object of the invention is to provide an effective and practical lubricating system which does not interfere with the running of the engine. For this reason, the lubrication is confined to the middle portion of the piston situated between the metallic packings at each end thereof.

If the piston, for instance, is used in an internal combustion engine, no surplus lubricating oil can pass into the combustion chamber of the engine or reach the spark plug to interfere with the proper ignition. In other words, the lubricating system is such that no oil is pumped by the piston into the combustion chamber of the engine, which is a disadvantage inherent in almost all other lubricating systems of this kind.

Another object of the invention is to provide a scar-proof lubricating piston, that is to say, the lubricating oil is furnished evenly around the circumference of the piston so that no scoring of the cylinder walls or the piston rings can take place, nor any cutting of the wrist pin or its bearings.

In the accompanying drawing;

Figure 1 represents a side elevation of a piston constructed in accordance with the subject matter of the present invention; and Figure 2 is a horizontal section along line 2—2 of Figure 1.

The piston consists of a hollow cylinder 10 with a solid top 11. About midway between the ends of the piston are provided a pair of sockets or bearings 12 placed diametrically opposite each other and intended to carry the wrist pin for the connecting rod of the crank shaft. The bearings are preferably provided with bushings 13, as indicated in Figure 1.

Near the top or closed end of the piston are provided grooves intended to carry a pair of metallic packings 14, and similarly at the opposite end of the piston one or more grooves are furnished for the metallic packing rings 15. The grooves, as indicated at 16 in Figure 1, have beveled edges 17 and along these edges are placed a series of lubricating apertures 18 and 19 running completely through the piston wall and having countersunk conical mouths 20 at the outer face of the cylindrical wall, which countersinks intersect with the beveled edges 17 of the packing ring grooves. The apertures 18 at the lower end of the piston are preferably positioned in alinement with the upper apertures 19 in the longitudinal direction of the piston.

Each of the upper apertures 19 is connected with one of the lower apertures 18, situated in staggered relation thereof, by means of an oil conveyer or channel 21 cut in the outer surface of the piston, as best seen in Figure 1, and the arrangement is made that the apertures nearest the wrist pin bearings 12 are connected with one of these conveyers or channels with one of the upper and one of the lower apertures 19 and 18 respectively.

As the cylindrical side wall of the piston is preferably made very thin, as seen at 22 in Figure 2, a reinforcing rib 23 is provided on the inner side of the piston wall under each of the grooves for the piston rings.

Lubricating oil is furnished for the piston in any suitable manner and delivered at a point between the upper and lower packing rings 14 and 16. During the reciprocation of the piston, any surplus oil will then gather along the beveled edges of the grooves adjacent to the upper and lower packing rings. As the counterbores 20 of the apertures 18 and 19 intersect with these grooves, it will be evident that the surplus oil will alternately enter the upper or the lower apertures according to in which direction the piston is moving at the time. Such surplus oil will accordingly be carried by the apertures to the inside of the piston into which there is free entry instead of entering under the packing rings in greater quantity than is needed for proper lubrication of the cylinder. Some of the lubricating oil in the upper apertures, for instance, will, during the compression stroke of the piston be compelled to follow the oil conveyers or channels 21 leading it to the corresponding apertures 18 at the other end of the piston, thereby furnishing constant lubrication during every stroke and along the complete circumference of the piston. Some of the oil will be led to the bushings 13 of the wrist pin and keep the same from becoming dry. In this manner, the piston rings and the cylinder walls are constantly supplied with fresh lubricating oil so that no scoring of the same is possible. Nor can any of the surplus oil pass beyond the packing rings and interfere with the proper working of the compression chamber and the spark plug, as merely the necessary moistening will take place under the packing rings, the surplus oil entirely taking the easier course of passing through the apertures 18 or 19 into the interior of the piston. There will always be found a certain quantity of oil in the countersinks 20 for the apertures 18 and 19 and the channels 21, so there is never any danger of the piston running dry.

From practical tests, it has been found that this piston stops the burning of the bearings. The reason is that the operator can fill up his crank case with cylinder oil so that the oil level will rise. Still the oil level cannot come up to the spark plug or to the combustion chamber, and the lubricating oil can, accordingly, not interfere with the proper operation of the engine.

Having thus described the invention, what is claimed as new is:

1. A hollow piston of the class described provided with spaced annular grooves, packing rings in said grooves, a series of apertures through the side wall of the piston, said apertures being arranged in spaced relation along the opposing faces of said spaced annular grooves, said grooves having beveled edges intersecting with said apertures, each of the apertures along one of said annular grooves being alined in longitudinal direction of the piston with an aperture at the other of said annular grooves, and an oil conveying channel connecting each of said apertures along one of said annular grooves with an aperture situated in staggered relation thereto at the other of said annular grooves.

2. A hollow piston of the class described provided with spaced annular grooves, packing rings in said grooves, a series of apertures through the side wall of the piston, said apertures being arranged in spaced relation along the opposing faces of said spaced annular grooves, said apertures having conical mouths, and said grooves having beveled edges intersecting with the conical mouths of said apertures, each of the apertures along one of said annular grooves being alined in longitudinal direction of the piston with an aperture at the other of said annular grooves, and an oil conveying channel connecting each of said apertures along one of said annular grooves with an aperture situated in staggered relation thereto at the other of said annular grooves.

3. A hollow piston of the class described provided with spaced annular grooves, packing rings in said grooves, a series of apertures through the side wall of the piston, said apertures being arranged in spaced relation along the opposing faces of said spaced annular grooves, said apertures having conical mouths, and said grooves having beveled edges intersecting with the conical mouths of said apertures, each of the apertures along one of said annular grooves being alined in longitudinal direction of the piston with an aperture at the other of said annular grooves, an oil conveying channel connecting each of said apertures along one of said annular grooves with an aperture situated in staggered relation thereto at the other of said annular grooves, and wrist pin bearings on the piston, one of said channels opening into each of said bearings.

In testimony whereof I affix my signature.

SAKARIAS K. NIEMI. [L. S.]